Oct. 9, 1928.  1,687,064
G. FURMANIK
DEVICE FOR FACILITATING THE SPREADING OF PARACHUTES
Filed Oct. 18, 1926
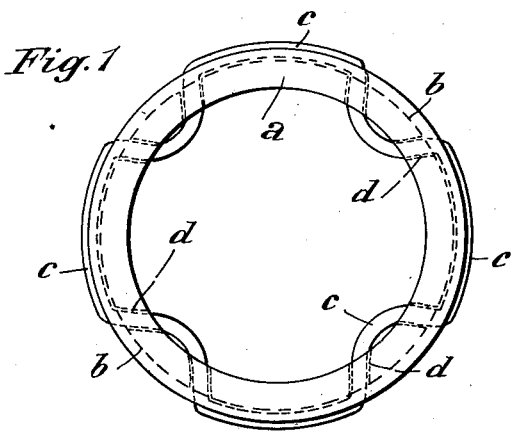
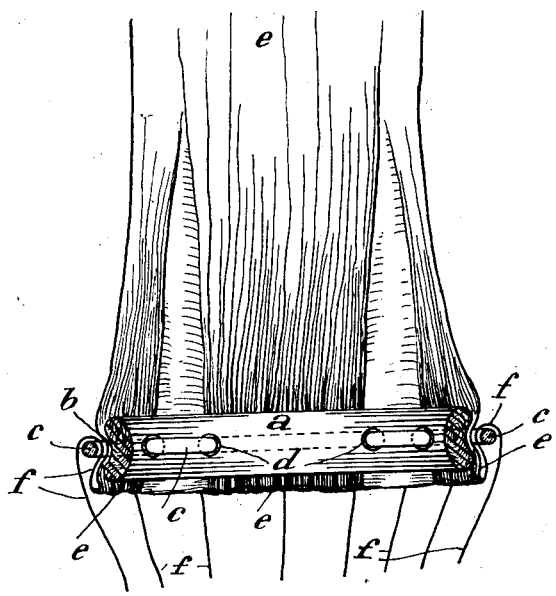
G. Furmanik
INVENTOR
By: Marks & Clerk
Attys.

Patented Oct. 9, 1928.

1,687,064

UNITED STATES PATENT OFFICE.

GIUSEPPE FURMANIK, OF ROME, ITALY, ASSIGNOR TO GIACOMO ACHILLE CALABI, OF ROME, ITALY.

DEVICE FOR FACILITATING THE SPREADING OF PARACHUTES.

Application filed October 18, 1926, Serial No. 142,487, and in Italy June 5, 1926.

This invention relates to a device for facilitating the spreading of parachutes in the moment they are launched from the aircraft. This device substantially comprises a ring of suitable material, with radial perforations in which an elastic cable is placed which is fitted into a groove of the outer circumference of the ring.

Between the elastic cable and the said outer groove or channel the peripheric end of the fabric of the parachute and its suspension ropes are inserted, so that at the moment of leap the air in penetrating into the inner circumference of the ring in addition to the pressure produced by weight will disengage the end of the fabric normally clamped between the elastic cable and the outer channel of the ring, so as to spread the parachute.

By way of example a form of invention is shown in the annexed drawings where

Fig. 1 is a plan view of the ring with the elastic cable and

Fig. 2 a sectioned elevation of ring applied to the rim of a parachute.

In these figures $a$ is the ring, $b$ the groove or channel in which the elastic cable $c$ is placed, $d$ are the diametrical perforations of the ring through which the elastic cable passes, $e$ is the peripheric end of the fabric of the parachute, and $f$ are the ropes.

Having now particularly described and ascertained the nature of said invention and in what manner the same is to be performed I declare that what I claim is:

1. A device for facilitating the spreading of parachutes including a ring having perforations therein and a channel in the outer circumference thereof, and an elastic cable passing through the perforations and partially locked in the channel and adapted to clamp the ropes and peripheral portion of the body of a parachute to ensure the admission of air at the moment of launching.

2. A device of the character described including a ring having perforations therein and also an outer circumferential groove, an elastic cable passing back and forth through the perforations and partially occupying the groove and adapted to clamp the peripheral portion of a parachute in the groove of the ring.

3. A device of the character described including a ring and an elastic cable partially located in said ring and adapted to clamp the peripheral portion of a parachute.

In testimony whereof I have hereunto signed my name.

GIUSEPPE FURMANIK.